(12) United States Patent
Lei et al.

(10) Patent No.: US 11,372,566 B2
(45) Date of Patent: Jun. 28, 2022

(54) METHOD AND DEVICE FOR STORING DATA

(71) Applicant: EMC IP Holding Company LLC, Hopkinton, MA (US)

(72) Inventors: Lu Lei, Shanghai (CN); Chen Wang, Shanghai (CN); Gary Jialei Wu, Shanghai (CN); Ronnie Yu Cai, Shanghai (CN); Ao Sun, Shanghai (CN)

(73) Assignee: EMC IP Holding Company, LLC, Hopkinton, MA (US)

( * ) Notice: Subject to any disclaimer, the term of this patent is extended or adjusted under 35 U.S.C. 154(b) by 32 days.

(21) Appl. No.: 16/565,925

(22) Filed: Sep. 10, 2019

(65) Prior Publication Data

US 2020/0004422 A1   Jan. 2, 2020

Related U.S. Application Data

(63) Continuation of application No. 15/710,956, filed on Sep. 21, 2017, now Pat. No. 10,445,013.

(30) Foreign Application Priority Data

Sep. 23, 2016 (CN) .......................... 201610847731.9

(51) Int. Cl.
*G06F 3/06* (2006.01)
*G06F 12/00* (2006.01)

(52) U.S. Cl.
CPC ............ *G06F 3/064* (2013.01); *G06F 3/0608* (2013.01); *G06F 3/0683* (2013.01); *G06F 12/00* (2013.01)

(58) Field of Classification Search
CPC ...... G06F 12/00; G06F 3/0608; G06F 3/0683; G06F 3/064
USPC .......................................................... 711/171
See application file for complete search history.

(56) References Cited

U.S. PATENT DOCUMENTS

| 8,909,894 | B1 | 12/2014 | Singh et al. |
| 9,317,123 | B2 | 4/2016 | Anurag et al. |
| 9,317,213 | B1* | 4/2016 | Gupta ..................... G06F 3/064 |
| 10,437,474 | B1 | 10/2019 | Armangau et al. |
| 2005/0268067 | A1 | 12/2005 | Lee et al. |
| 2011/0055178 | A1* | 3/2011 | Mark .................... G06F 3/0622 |
| | | | 707/697 |
| 2012/0017038 | A1* | 1/2012 | Gorobets ............ G06F 11/1658 |
| | | | 711/103 |
| 2014/0258650 | A1* | 9/2014 | Vishniac ............... G06F 3/0652 |
| | | | 711/159 |

(Continued)

FOREIGN PATENT DOCUMENTS

| CN | 101547184 | 9/2009 |
| WO | 20160115737 | 7/2016 |

*Primary Examiner* — Gautam Sain
(74) *Attorney, Agent, or Firm* — BainwoodHuang

(57) ABSTRACT

Embodiments of the present disclosure provide a method and device for storing data. The method comprises: generating a data block corresponding to data to be stored; aligning the data block to a boundary of a tracking unit of a predefined size for validating the data; and storing the aligned data block in at least one storage unit of a storage space, the at least one storage unit having an identical size. The method according to embodiments of the present disclosure can align the data block so as to minimize the waste of storage space and avoid the situation where the rest data cannot be validated due to disappearance of partial data.

22 Claims, 14 Drawing Sheets

(56) References Cited

U.S. PATENT DOCUMENTS

| | | | |
|---|---|---|---|
| 2014/0310483 A1* | 10/2014 | Bennett | G06F 3/0619 |
| | | | 711/154 |
| 2016/0188214 A1* | 6/2016 | Nakamura | G06F 3/0656 |
| | | | 711/154 |
| 2020/0133549 A1 | 4/2020 | Armangau et al. | |
| 2020/0134045 A1 | 4/2020 | Armangau et al. | |
| 2020/0241763 A1 | 7/2020 | Armangau et al. | |

* cited by examiner

US 11,372,566 B2

METHOD AND DEVICE FOR STORING DATA

RELATED APPLICATIONS

This application is a continuation of U.S. patent application Ser. No. 15/710,956, filed Sep. 21, 2017 and entitled "METHOD AND DEVICE FOR STORING DATA," which claims benefit of the priority of Chinese Patent Application No. CN201610847731.9, filed on Sep. 23, 2016 at the State Intellectual Property Office, China, entitled "METHOD AND DEVICE FOR STORING DATA." The contents and teachings of both prior applications are incorporated herein by reference in their entirety.

FIELD

Embodiments of the present disclosure relate to computer storage techniques, and more specifically to method, device and computer program product for storing data.

BACKGROUND

Elastic Cloud Service (ECS) is a vital component of cloud computing services and provides a service platform of comprehensive professional ability for all kinds of Internet users. The platform integrates the three traditional core elements of Internet application: computing, storage and network, offering public Internet infrastructure services for users. In terms of storage, when an object is deleted or a part of an object gets overwritten, the space used to store the deprecated data should be Garbage Collected (GC) to make more room for storing new data. To implement an efficient GC mechanism, an improved data storage solution is needed.

SUMMARY

In general, embodiments of the present disclosure provide a method, device and computer program product for storing data.

According to one aspect of the present disclosure, there is provided a method for storing data. The method comprises: generating a data block corresponding to data to be stored; aligning the data block to a boundary of a tracking unit of a predefined size for validating the data; and storing the aligned data block in at least one storage unit of a storage space, the at least one storage unit having an identical size.

According to second aspect of the present disclosure, there is provided an electronic device. The device includes: a processing unit; and a memory stored with instructions, which, when executed by the processor, causes the electronic device to: generate a data block corresponding to data to be stored; align the data block to a boundary of a tracking unit of a predefined size for validating the data; and store the aligned data block in at least one storage unit of a storage space, the at least one storage unit having an identical size.

Other aspects of the present disclosure further comprise a computer program product, which is tangibly stored on a non-transient computer readable medium and comprises machine-readable instructions. The machine-readable instructions, when executed, allow the machine to implement one or more steps of the above method.

It should be understood that the contents described in the Summary neither aim to limit key or vital features of the embodiments of the present disclosure, nor limit the scope of the present disclosure. Other features of the present disclosure are easy to understand through the following description.

BRIEF DESCRIPTION OF THE DRAWINGS

Through the following detailed description with reference to the accompanying drawings, the above and other objectives, features, and advantages of example embodiments of the present disclosure will become more apparent. In the drawings, same or similar reference signs represent the same or similar elements, wherein.

DETAILED DESCRIPTION OF EMBODIMENTS

Embodiments of the present disclosure will be described in details with reference to the drawings. Although the drawings illustrate some embodiments of the present disclosure, it should be appreciated that the present disclosure can be implemented in various manners and should not be limited to the embodiments described herein. On the contrary, those embodiments are presented for a more thorough and complete understanding of the present disclosure. It should be understood that the drawings and the embodiments of the present disclosure are merely exemplary and do not limit the protection scope of the present disclosure.

Figure 1:
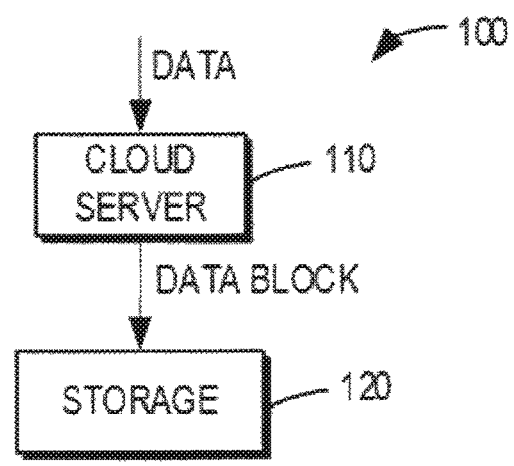
FIG. 1 is a schematic diagram of an example scenario of an ECS in which embodiments of the present disclosure can be implemented.

FIG. 1 illustrates a schematic diagram 100 of an example scenario of an ECS in which embodiments of the present disclosure are implemented. The scenario involves cloud storage services. As shown in FIG. 1, a cloud server 110 can receive data to be stored from outside, e.g., from users, and store the data in a storage space of a storage 120 which can be any types of machine-readable storage media, e.g., non-volatile memory and volatile memory etc.

Figure 2:
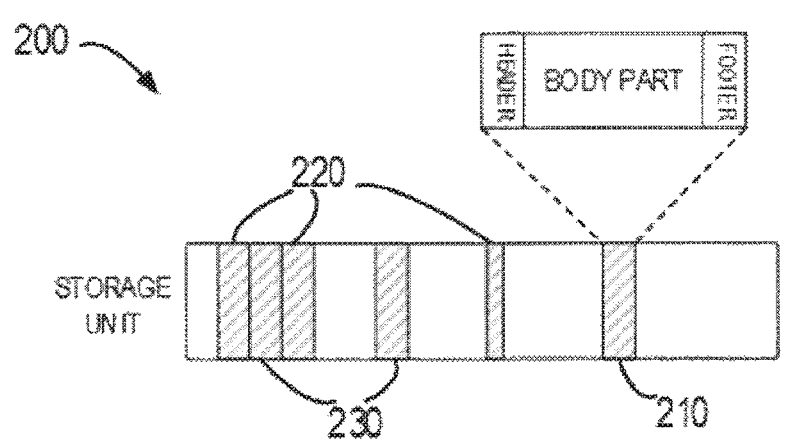
FIG. 2 is a schematic diagram of a process of storing data in a storage unit of a storage space in the prior art.

The ECS usually uses a method for disk capacity management, which hardly relies on a file system. All disk storage space is partitioned into a set of blocks of fixed size and each of the blocks is a storage unit of the storage space, or called as a chunk. All user data is stored in the storage units and the storage units are shared, i.e., one storage unit can comprise fragments of several user objects. FIG. 2 is a schematic diagram of a process 200 of storing data in a storage unit of a storage space in the prior art. The cloud server 100, after receiving the data to be stored as shown in FIG. 1, can generate a data block corresponding to the data, as denoted by 210 in FIG. 2.

The data block comprises a header, a body part and a footer, the header including information about the size of the data block, the body part including real data and the footer including a checksum for the header and the body part to help detect any corruption, if exists, in the data block. Besides, the cloud server 100 can store the generated data block into the storage units of the storage space. One storage unit can contain a plurality of fragments of a plurality of user objects, as indicated by 210, 220 and 230 in FIG. 2, wherein 210 refers to a data block of a user object 1, 220 represents a data block of a user object 2 and 230 denotes a data block of a user object 3.

Usually, the size of a data block can be up to W bytes, and W can be 2 MB for example. If data from one user object is larger than W, it will be divided into several data blocks to be written into the storage units. For data much smaller than W, the corresponding data block is also smaller than W. As a result, start and end offsets of a data block in one storage unit are pretty much arbitrary if the data block is simply written one after another. In this case, because the storage units are immutable in the ECS, some parts of the corresponding storage unit become garbage data when an object is deleted or a part of an object is overwritten. The garbage data range needs to be reused in order to have efficient storage consumption.

No matter what GC mechanism is used, there must be some metadata used to track where the garbage data ranges are located in each storage unit, and then the metadata information is used to construct new storage units for holding new data. It is impossible to have the amount of metadata to be too large so that it overweighs the benefit of doing the GC to free up disk spaces. To reduce the GC related metadata size, bitmap is used to track, starting from offset 0 of the storage unit, data of each size unit on the storage unit so as to determine whether it is fully garbage or not. For simplicity, the size of a tracking unit for GC is also chosen to be W (2 MB for instance).

Figure 3:
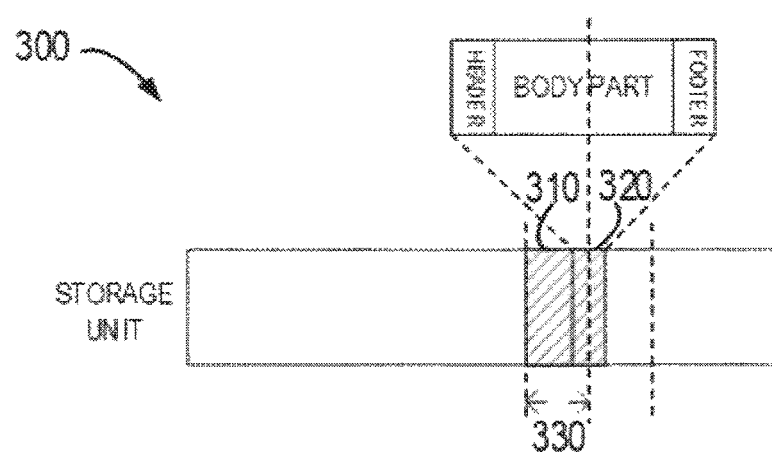
FIG. 3 is a schematic diagram of problems in data validation of a tracking unit for GC in the prior art.

The problem with arbitrary offset of the data block is that after GC, a part of the data on the storage unit is processed by GC while the rest part cannot be validated with checksum anymore. This problem is explained in details with reference to FIG. 3. FIG. 3 is a schematic diagram 300 of problems in data validation of a tracking unit for GC in the prior art. As shown in FIG. 3, there is one garbage tracking unit 330 in which some garbage data 310 already exists, and a new data block 320 crosses the boundary of the garbage tracking unit 330. Assuming the data block 320 also becomes garbage data, the whole garbage tracking unit 330 is garbage data now and can be processed by GC. However, after GC processing, as the header and a portion of the body part of the data block 320 is gone with the tracking unit processed by GC, when validating data on the next tracking unit, it is not possible to know where the next valid data block starts, which is necessary for the data validation.

Figure 4:
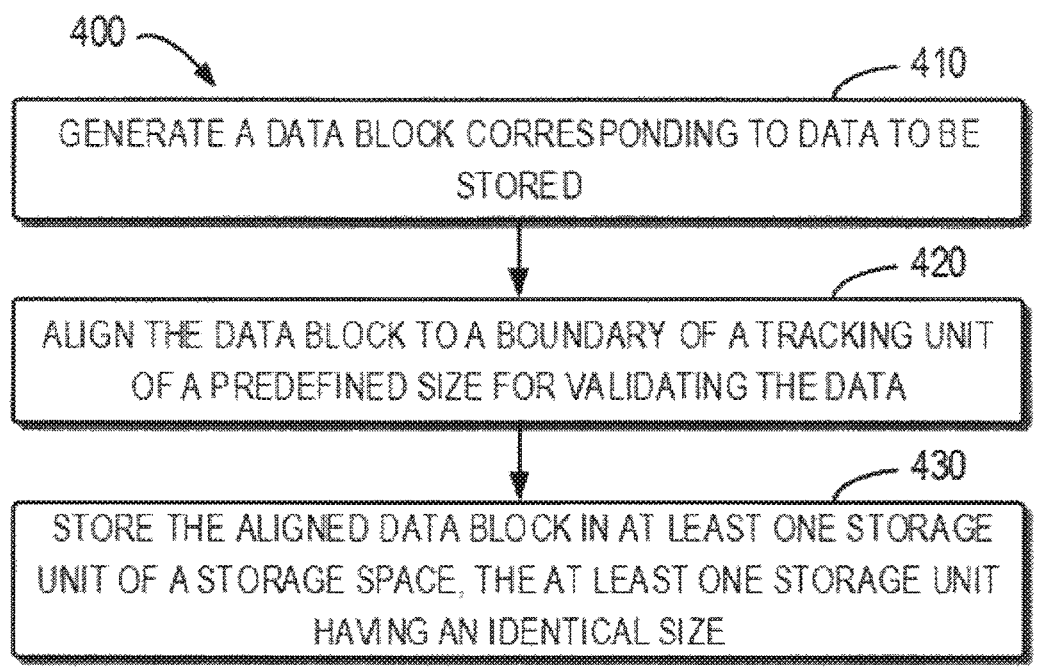
FIG. 4 is a flow chart of a method for storing data according to embodiments of the present disclosure.

In light of the above problems, the main concept of the embodiments of the present disclosure is: a data block, when storing in the storage space, is aligned to the boundary of the tracking unit, so as to avoid the above situation in which data validation cannot be performed. FIG. 4 is a flow chart of a method 400 for storing data according to embodiments of the present disclosure. The method 400 can be implemented at the cloud server 110 indicated in FIG. 1.

As shown in FIG. 4, a data block corresponding to data to be stored is generated at 410. According to embodiments of the present disclosure, a data block consisting of a header, a body part and a footer can be generated, the header indicating the size of the data block, the body part including the data and the footer including a checksum for the header and the body part. The processing is similar to what is described above at 210 with reference to FIG. 2.

At 420, the data block is aligned to a boundary of a tracking unit. The tracking unit is for validating the data and has a predefined size. According to embodiments of the present disclosure, the tracking unit for data validation can be related to GC processing. It should be understood that the solutions in the embodiments of the present disclosure can be applied to any situations suitable for data alignment besides GC processing. For the sake of convenience, embodiments of the present disclosure are described below by taking alignment to a boundary of a tracking unit for GC processing as an example. According to embodiments of the present disclosure, the size of the tracking unit can be the maximum size of the data block, e.g., the aforementioned W.

At 430, the aligned data is stored in the storage units of the storage space, the storage units having an identical size. Therefore, the above situation in which data validation cannot be performed is avoided and the overall system performance is improved.

Figure 5:
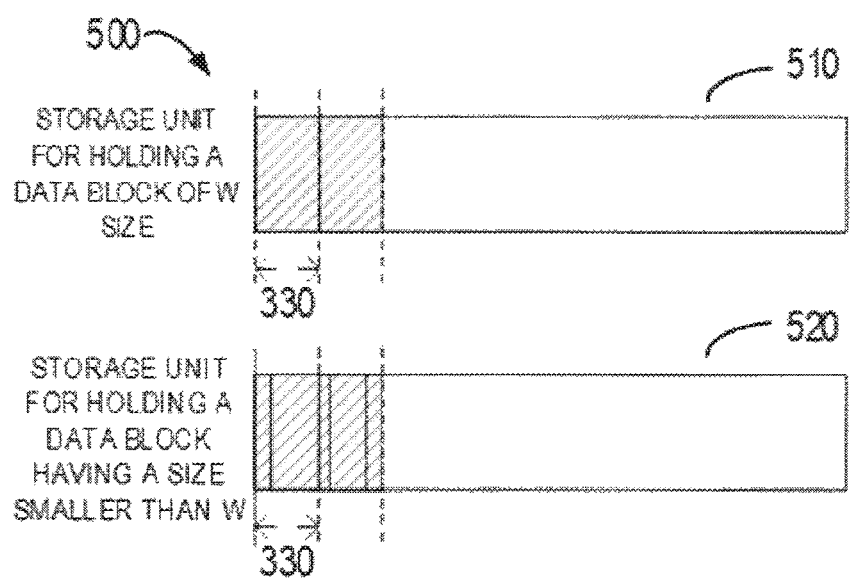
FIG. 5 is a schematic diagram of a data storage scheme according to embodiments of the present disclosure.

To make it easy to understand, more example implementations of the embodiments of the present disclosure are described with reference to FIGS. 5-12. FIG. 5 is a schematic diagram 500 of a data storage scheme according to embodiments of the present disclosure. As illustrated in FIG. 5, in the data storage scheme according to embodiments of the present disclosure, the storage unit is partitioned into a storage unit 510 for holding a data block having a size equal to a predefined size of a tracking unit (e.g., 330) and a storage unit 520 for holding a data block having a size smaller than a predefined size of a tracking unit (e.g., 330).

For example, the predefined size of the tracking unit can be the aforementioned W, such as W=2MB. For a data block having a size equal to an integral multiple of the predefined size of the tracking unit 330, it can be split into at least one data block of a predefined size and stored in the storage unit 510. In this case, as the data block is aligned to the boundary of the tracking unit 330 naturally, at least one whole block of W size is guaranteed to get free if an object larger than W is removed.

For a data block having a size smaller than the predefined size of the tracking unit 300 or the remaining data after a large object data is split into data blocks of a predefined size, it can be aligned to the boundary of the tracking unit 330 before being stored in the storage unit 520. Therefore, the above situation where data validation cannot be performed is avoided. Now more detailed description is provided with reference to FIG. 6.

Figure 6:
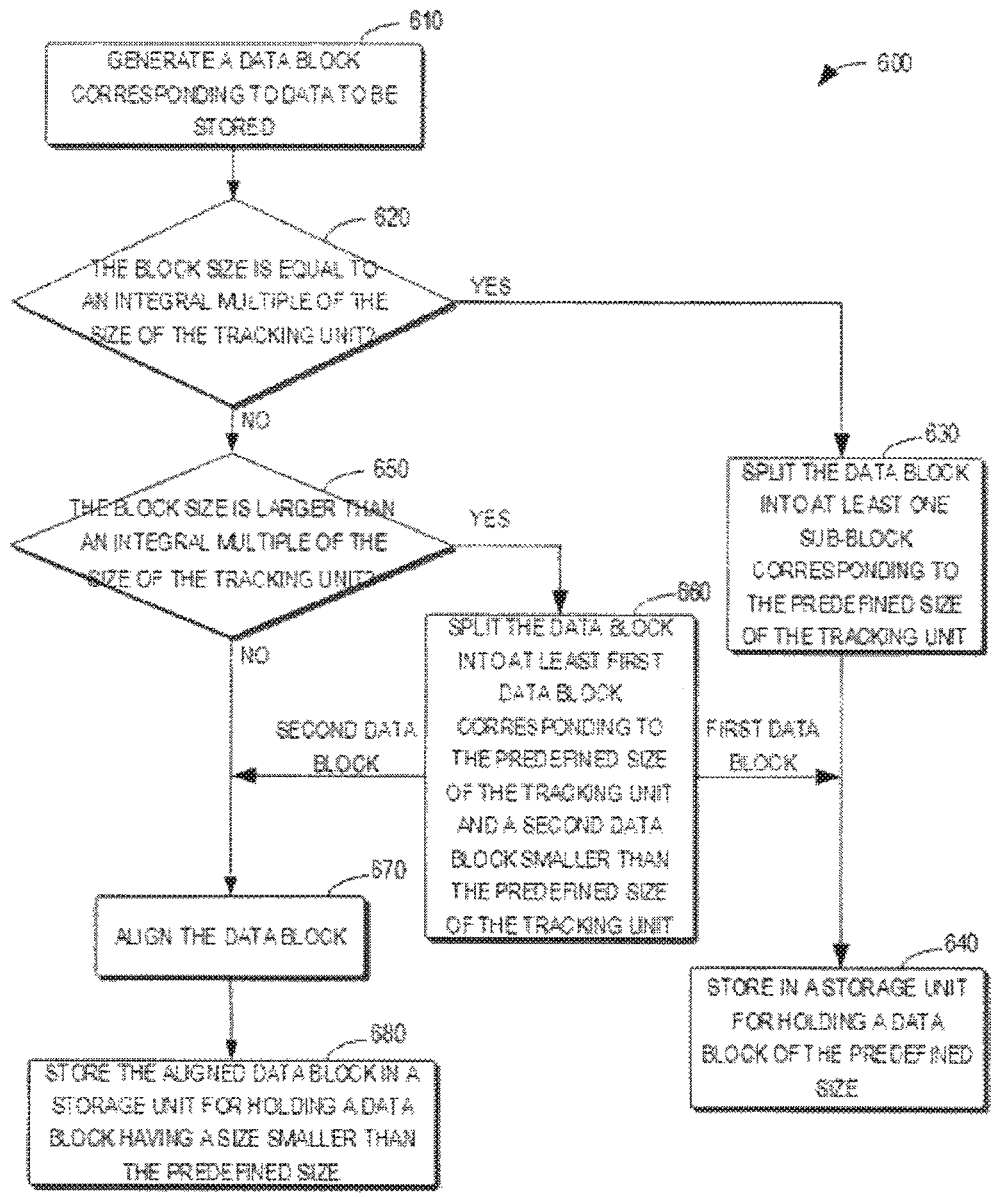
FIG. 6 is a flow chart of a method for storing data according to embodiments of the present disclosure.

FIG. 6 is a flow chart of a method 600 for storing data according to embodiments of the present disclosure. The method 600 can be implemented at the cloud server 110 of FIG. 1. As shown in FIG. 6, a data block corresponding to data to be stored is generated at 610. The process for generating a data block is similar to what is described above at 210 with reference to FIG. 2 and 410 with reference to FIG. 4, so it will not be repeated here.

At 620, it is determined whether the size of the data block is equal to an integral multiple of a predefined size of a tracking unit (e.g., 330). If the size of the data block is equal to an integral multiple of W, it proceeds to 630, at which the data block is split into at least one sub-block of W size. Besides, the split sub-blocks are stored in a storage unit for holding a data block of W size at 640. Regarding splitting at

630, according to the embodiments of the present disclosure, the body part of the data block can be split into corresponding data portions, and respective sub-blocks are generated for the split data portions. Meanwhile, identical metadata is generated for the split data portions, that is, the split sub-blocks are indicated by the identical metadata. Therefore, all generated sub-blocks are still written in one single write request, and the split sub-blocks are also read in the same request when reading the data back. Because they are tracked by the identical metadata, it requires no additional read/write requests. Furthermore, there is no overhead for storing metadata since the identical metadata pointed to an object is used.

If the size of the data block is determined not equal to an integral multiple of W at 620, it proceeds to 650, at which it is determined whether the size of the data block is larger than an integral multiple of W. If the size of the data block is determined to be larger than an integral multiple of W, the data block is split into at least one first data block of W size and a second data block smaller than W at 660. The splitting is similar to the processing described with reference to 630 and will not be repeated here. The first data block can be stored in a storage unit for holding a data block of W size at 640. The second data block can be aligned at 670 based on the end offset of the second data block and the boundary of the tracking unit, so as to align the second data block to the boundary of the tracking unit 330. The aligned second data block is then stored in a storage unit for holding a data block smaller than W at 680. Similarly, if the size of the data block is determined to be smaller than an integral multiple of W at 650, i.e., the size of the data block is smaller than W, the data block is aligned at 670 based on the end offset of the data block and the boundary of the tracking unit, so as to align the data block to the boundary of the tracking unit 330. According to embodiments of the present disclosure, it is determined, based on a comparison of the end offset of the second data block with the boundary of the tracking unit, whether the second data block is to be split. In response to determining that the second data block is to be split: the second data block is split into a first sub-block and a second sub-block; generate identical metadata for the first sub-block and the second sub-block; and determine, based on a comparison of the end offset of the split sub-block with the boundary of the tracking unit, whether a corresponding padding block is to be generated to fill between the end offset of the split sub-block and the boundary of the tracking unit. Thus, the alignment of the data block is fulfilled. Then, the aligned data block is stored in the storage unit for holding a data block smaller than W at 680.

Figure 7:
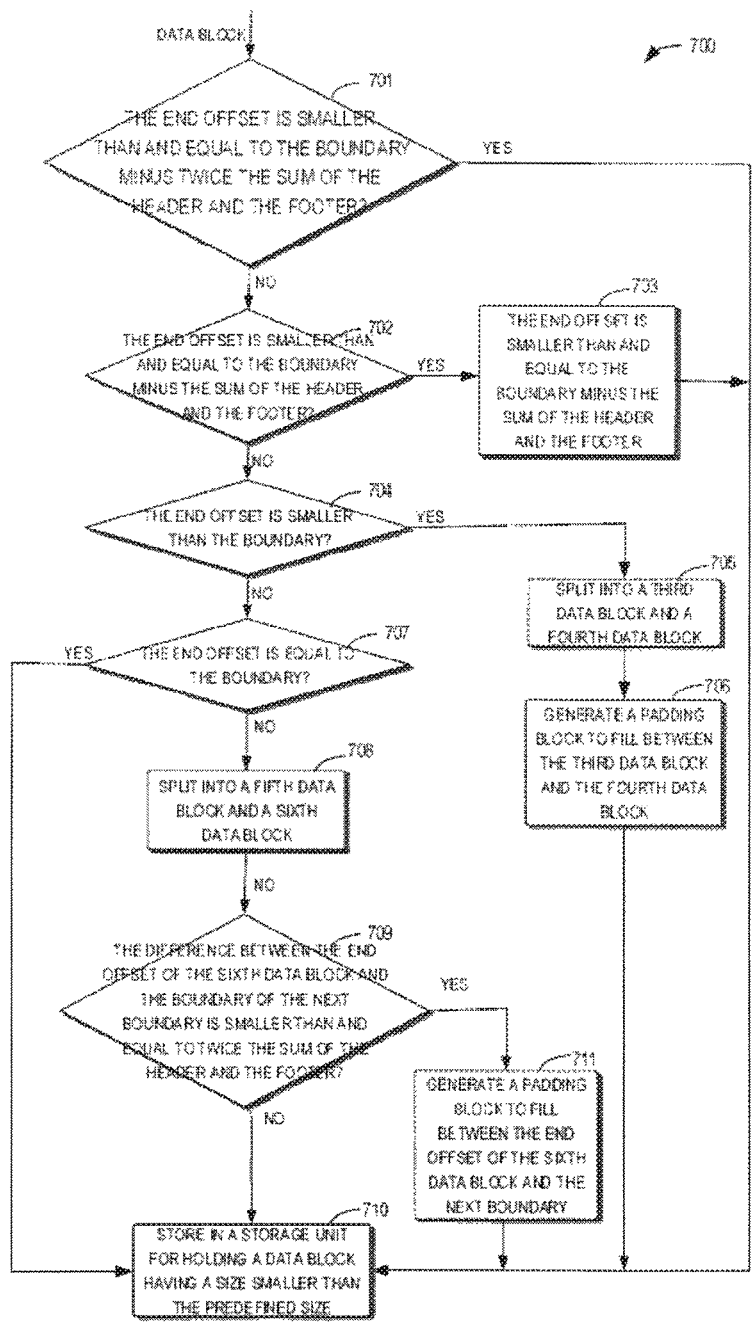
FIG. 7 is a flow chart of a method for storing data according to embodiments of the present disclosure.

Example processes for aligning (i.e., 670 of FIG. 6) data blocks smaller than the predefined size of the tracking unit are described in details with reference to FIGS. 7 to 12. FIG. 7 is a flow chart of a method 700 for storing data according to embodiments of the present disclosure. The method 700 can also be implemented at the cloud server 110 of FIG. 1. FIGS. 8 to 12 respectively show schematic diagrams of data storage process 800-1200 according to various embodiments of the present disclosure.

As shown in FIG. 7, regarding data blocks smaller than the predefined size (e.g., W) of the tracking unit (300 for example), it is determined whether the end offset of the data block is smaller than the boundary of the tracking unit 330 minus twice the sum of the size of header and the size of footer of the data block at 701. Herein, the boundary of the tracking unit means the closest boundary after the end offset of the data block. If the end offset of the data block is determined smaller than the boundary of the tracking unit 330 minus twice the sum of the size of header and the size of footer of the data block, the data block is stored in the storage unit for holding a data block smaller than the predefined size W at 710.

Figure 8:
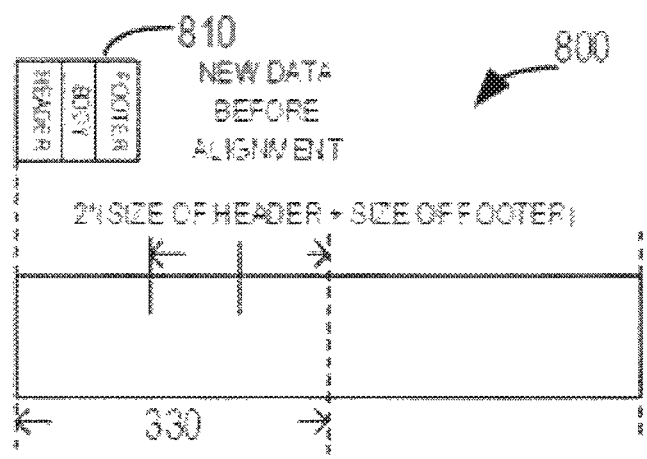
FIGS. 8-12 respectively show a schematic diagram of data storage process according to various embodiments of the present disclosure.

FIG. 8 shows a schematic diagram of a data storage process 800 in this situation. As illustrated in FIG. 8, if the storage unit is completely free for example, the end offset of the data block 810 is smaller than the boundary of the tracking unit 330 minus twice the sum of the size of header and the size of footer of the data block 810. In this case, the data block is directly stored in the storage unit for holding a data block smaller than the predefined size W.

Now return to FIG. 7. If the end offset of the data block is determined not smaller than the boundary of the tracking unit 330 minus twice the sum of the size of header and the size of footer of the data block at 701, determine whether the end offset of the data block is smaller than the boundary of the tracking unit 330 minus the sum of the size of header and the size of footer of the data block at 702. If the end offset of the data block is determined smaller than the boundary of the tracking unit 330 minus the sum of the size of header and the size of footer of the data block at 702, a padding block is generated at 703 to fill between the end offset of the data block and the boundary of the tracking unit 330, and the data block along with the padding block are stored in the storage unit for holding a data block smaller than W at 710.

Figure 9:
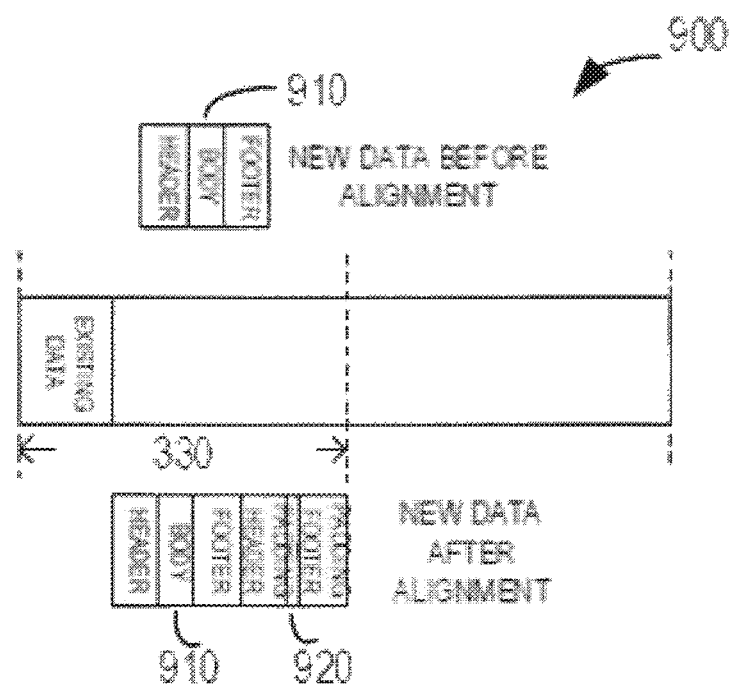

FIG. 9 shows a schematic diagram of a data storage process 900 in this situation. As illustrated in FIG. 9, while there is existing data in the storage unit, the end offset of the data block 910 is smaller than the boundary of the tracking unit 330 minus the sum of the size of header and the size of footer of the data block at 910, and larger than the boundary of the tracking unit 330 minus twice the sum of the size of header and the size of footer of the data block 910. In this case, a padding block 920 is generated, and the padding block comprises a padding header indicating the size of the padding block 920, a body part being zero and a padding footer including the checksum for the padding header and body part. Afterwards, the data block 910 is stored in the storage unit along with the padding block 920.

Return to FIG. 7. If the end offset of the data block is determined not smaller than the boundary of the tracking unit 330 minus the sum of the size of header and the size of footer of the data block at 702, it is determined whether the end offset of the data block is smaller than the boundary of the tracking unit 330 at 704. If the end offset of the data block is determined smaller than the boundary of the tracking unit 330 at 704, the data block is split into a third data block and a fourth data block at 705, and the identical metadata is generated for the third and fourth data blocks. The splitting is similar to the processing described with reference to 630 and 660 of FIG. 6 and will not be repeated here.

A padding block is generated at 706 to fill between the third data block and the fourth data block, such that the end offset of the padding block aligns to the boundary of the tracking unit 330. According to embodiments of the present disclosure, a padding block consisting of a header, a body part and a footer is generated, the header indicating the size of the padding block, the body part being zero, and the footer including the checksum for the header and the body part. Because the padding block includes zero data (i.e., empty body), its size is always fixed, which is easy to validate correctness. Then, the split third data block, the generated padding block and the split fourth data block are stored together in the storage unit for holding a data block smaller than W at 710.

Figure 10:
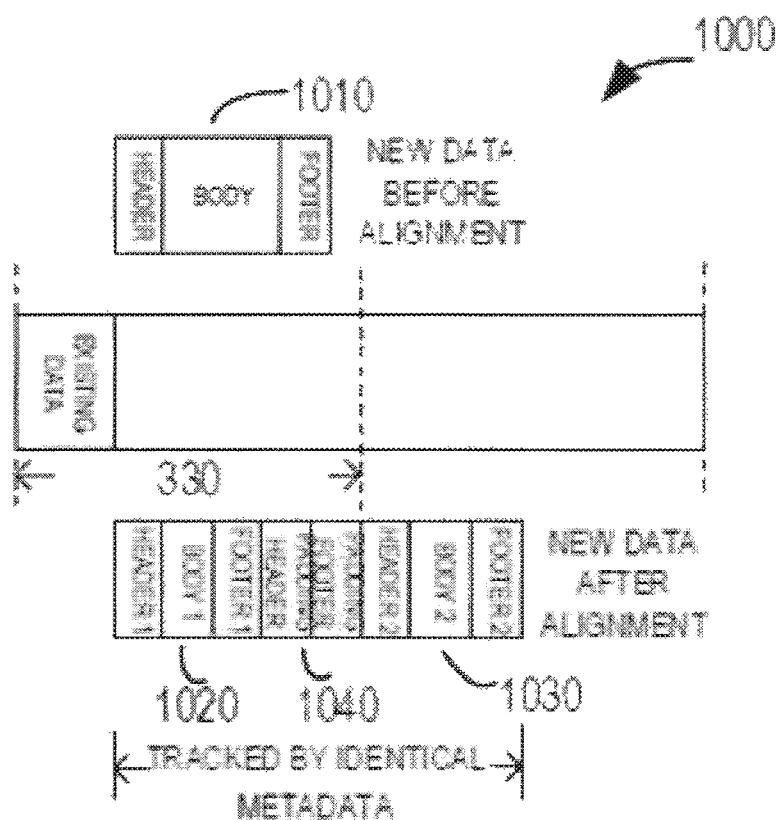

FIG. 10 shows a schematic diagram of data storage process 1000 in this situation. As illustrated in FIG. 10, while there is existing data in the storage unit, the end offset of the data block 1010 is smaller than the boundary of the tracking unit 330 and larger than the boundary of the tracking unit 330 minus twice the sum of the size of header and the size of footer of the data block 1010. In this case, the data block 1010 is split into a data block 1020 and a data block 1030 and a padding block 1040 is generated to insert between data block 1020 and data block 1030, such that the end offset of the padding block 1040 aligns to the boundary of the tracking unit 330. The splitting and padding are similar to the processing described with reference to 630 and 660 of FIG. 6 and 706 of FIG. 7 and will not be repeated here. Subsequently, the data block 1020, the padding block 1040 and the data block 1030 are stored in the storage unit together as shown in FIG. 10.

Return to FIG. 7, if the end offset of the data block is determined not smaller than the boundary of the tracking unit 330 at 704, determine whether the end offset of the data block is equal to the boundary of the tracking unit 330 at 707. If the end offset of the data block is determined equal to the boundary of the tracking unit 330 at 707, the data block is directly stored in the storage unit at 710.

If the end offset of the data block in the storage unit is determined not equal to the boundary of the tracking unit 330 at 707, i.e., smaller than the boundary of the tracking unit 330, the data block is split into a fifth data block and a sixth data block at 708, and identical metadata is generated for the fifth and sixth data blocks, such that the end offset of the fifth data block aligns to the boundary of the tracking unit 330. The splitting is similar to the processing described with reference to 630 and 660 of FIG. 6 and 705 of FIG. 7 and will not be repeated here.

Figure 11:
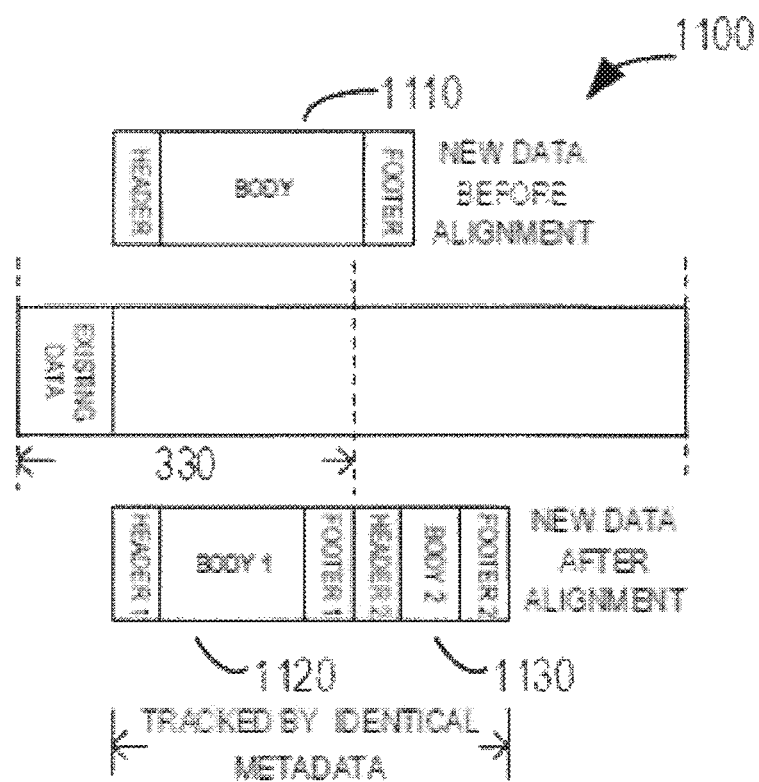

FIG. 11 shows a schematic diagram of a data storage process 1100 in this situation. As illustrated in FIG. 11, while there is existing data in the storage unit, the end offset of the data block 1110 exceeds (larger than) the boundary of the tracking unit 330. In this case, the data block 1110 is split into a data block 1120 and a data block 1130, such that the end offset of the data block 1120 aligns to the boundary of the tracking unit 330 and the identical metadata is generated for the data blocks 1120 and 1130.

Return to FIG. 7, at 709, it is determined whether the difference between the end offset of the sixth data block in the storage unit and the boundary of the next tracking unit (i.e., next boundary) is smaller than and equal to twice the sum of the header and the footer of the data block. If the difference between the end offset of the data block in the storage unit and the boundary of the next tracking unit (i.e., next boundary) is determined smaller than and equal to twice the sum of the header and the footer of the data block, a padding block is generated at 711 to fill between the end offset of the data block and the next boundary. The padding is similar to the above processing with reference to 706 of FIG. 7 and will not be repeated. Then, the split fifth data block and the split sixth data block are stored in the storage unit along with the padding block at 710. If the difference between the end offset of the data block in the storage unit and the boundary of the next tracking unit (i.e., next boundary) is determined larger than twice the sum of the header and the footer of the data block at 709, the split fifth data block and the split sixth data block are directly stored in the storage unit at 710.

Figure 12:
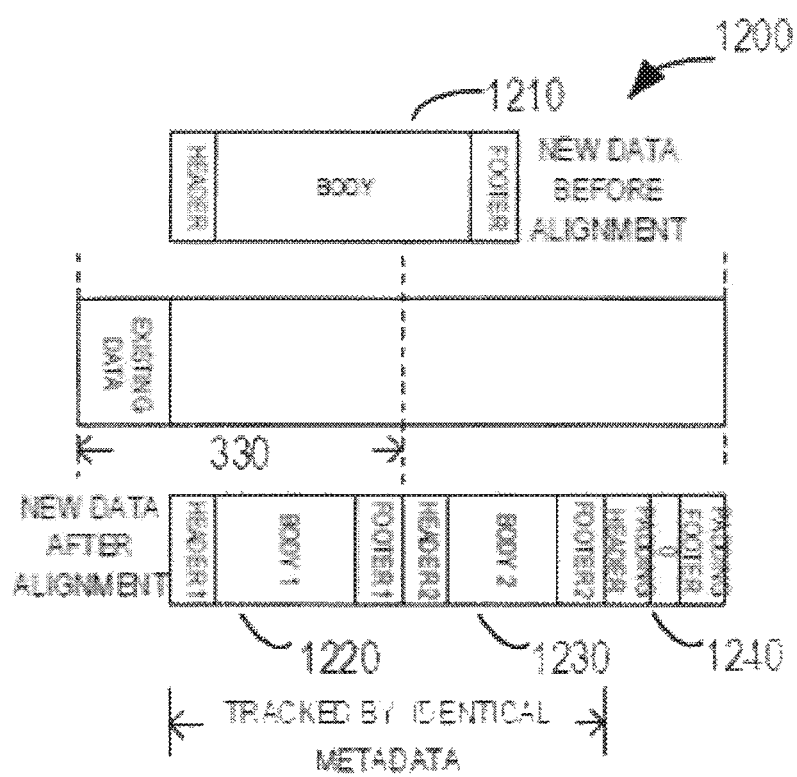

FIG. 12 shows a schematic diagram of a data storage process 1200 in this situation. As illustrated in FIG. 12, while there is existing data in the storage unit, the end offset of the data block 1210 exceeds (larger than) the boundary of the tracking unit 330. In this case, the data block 1210 is split into a data block 1220 and a data block 1230, such that the end offset of the data block 1220 aligns to the boundary of the tracking unit 330 and the identical metadata is generated for the data blocks 1220 and 1230. The process is similar to the above process shown with reference to FIG. 11. The difference lies in further determining whether a further alignment is required based on the split data block 1230, which further improves data alignment efficiency and ensures the overall system performance. For example, if the difference between the end offset of the split data block 1230 and the boundary of the next tracking unit is smaller than and equal to twice the sum of the size of the header and the size of the footer of the data block, a padding block 1240 is generated to fill between the end offset of the data block 1230 and the boundary of the next tracking unit.

It should be appreciated that embodiments shown in FIGS. 6 and 7 are only exemplary and shall not limit the present invention. Those skilled in the art, based on the disclosure of the description, can contemplate other implementation manners to perform the data storage method in FIG. 4. So far, the method for storing data according to embodiments of the present disclosure has been described. According to embodiments of the present disclosure, by aligning the data blocks, the waste of the storage space is minimized, and the situation where the rest data cannot be validated due to disappearance of partial data can also be avoided.

Figure 13:
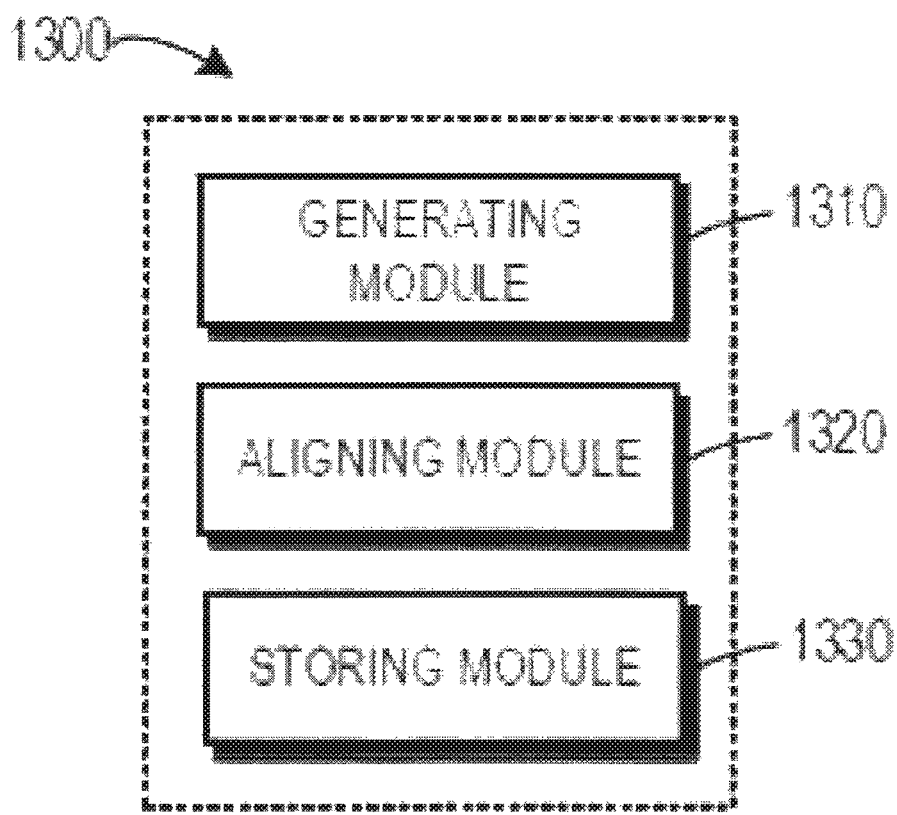
FIG. 13 illustrates a schematic structural diagram of an apparatus for storing data according to embodiments of the present disclosure.

Embodiments of the present disclosure also correspondingly provide an apparatus for storing data and the apparatus will be described with reference to FIG. 13. FIG. 13 illustrates a schematic structural diagram of an apparatus 1300 for storing data according to embodiments of the present disclosure. The apparatus 1300 can be implemented at a server side (e.g., the cloud server 110 of FIG. 1).

As shown in FIG. 13, the apparatus 1300 can comprise a generating module 1310, an aligning module 1320 and a storing module 1330. Specifically speaking, the generating module 1310 can be configured to generate a data block corresponding to data to be stored. In one embodiment, the generating module 1310 can be further configured to generate a data block consisting of a header, a body part and a footer, the header indicating the size of the data block, the body part including the data and the footer including a checksum for the header and the body part.

The aligning module 1320 is configured to align the data block to a boundary of a tracking unit of a predefined size for validating the data. The storing module 1330 is configured to store the aligned data block in at least one storage unit of a storage space, the at least one storage unit having an identical size. In one embodiment, the aligning module 1320 can comprise (not shown in the drawings): a first splitting sub-module configured to split the data block into at least one sub-block of the predefined size in response to the size of the data block being an integral multiple of the predefined size of the tracking unit; and a first generation sub-module configured to generate the identical metadata for the at least one sub-block. In the embodiment, the storing module 1330 comprises: a storing sub-module configured to store the at least one sub-block in a storage unit for holding a data block of the predefined size.

In another embodiment, the aligning module 1320 can comprise (not shown in the drawings): a second splitting sub-module configured to split the data block into at least one first data block and a second data block in response to the size of the data block being larger than an integral multiple of the predefined size of the tracking unit, wherein each of the at least one first data block has a size equal to the predefined size of the tracking unit and the second data block has a size smaller than the predefined size of the tracking unit; a second generating sub-module configured to generate the identical metadata for the at least one first data block and the second data block; and an aligning sub-module configured to align the second data block to the boundary of the tracking unit based on an end offset of the second data block and the boundary of the tracking unit. In the present embodiment, the storing module 1330 can comprise (not shown in the drawings): a first storing sub-module configured to store the at least one first data block in the storage unit for holding a data block of the predefined size; and a second storing sub-module configured to store the aligned second data block in a storage unit for holding a data block smaller than the predefined size. In one embodiment, the aligning sub-module can comprise: a determining sub-module configured to determine, based on a comparison of the end offset of the second data block with the boundary of the tracking unit, whether the second data block is to be split; and a splitting and padding sub-module configured, in response to determining that the second data block is to be split, to: split the second data block into a first sub-block and a second sub-block; generate identical metadata for the first sub-block and the second sub-block; and determine, based on a comparison of the end offset of the split sub-block with the boundary of the tracking unit, whether a corresponding padding block is to be generated to fill between the end offset of the split sub-block and the boundary of the tracking unit. In one embodiment, the aligning sub-module can also comprise: a padding sub-module configured to generate the padding block consisting of a header, a body part and a footer, the header indicating the size of the padding block, the body part being zero and the footer including a checksum for the header and the body part.

In another embodiment, the aligning sub-module can further be configured to: align, based on the end offset of the data block and the boundary of the tracking unit, the data block to the boundary of the tracking unit in response to the size of the data block being smaller than the predefined size of the tracking unit. In one embodiment, the determining sub-module can be configured to determine, based on a comparison of the end offset of the data block with the boundary of the tracking unit, whether the data block is to be split. The splitting and padding sub-module can be configured, in response to determining that the data block is to be split, to: split the data block into a third data block and a fourth data block; generate identical metadata for the third data block and the fourth data block; and determine, based on a comparison of the end offset of the split block with the boundary of the tracking unit, whether a corresponding padding block is to be generated to fill between the end offset of the split block and the boundary of the tracking unit.

It should be understood that each unit as recited in the apparatus 1300 is respectively corresponding to each step in methods 400-700 described with reference to FIGS. 4 to 7. Besides, the apparatus 1300 and the operations and features included in its units correspond to the operations and features described above with reference to FIGS. 4 to 7 and achieve the same effects. The details will not be repeated here.

The modules included in the apparatus 1300 can be implemented by various manners, including software, hardware, firmware and any combinations thereof. In one embodiment, one or more modules can be implemented using software and/or firmware, such as machine-executable instructions stored on the storage medium. Apart from the machine-executable instructions or as a substitution, the modules included in the apparatus 1300 can be partially or fully implemented by one or more hardware logic components. As an example rather than a limitation, the available examples of the hardware logic components comprise field programmable gate array (FPGA), application-specific integrated circuit (ASIC), application-specific standard product (ASSP), system on chip (SOC), complex programmable logic device (CPLD) and so on.

All modules shown in FIG. 13 can be partially or fully implemented as hardware module, software module, firmware module or any combinations thereof. Particularly, in some embodiments, the above described procedure, method or process can be implemented by the storage system or a host corresponding to the storage system or hardware in other computing devices independent of the storage system.

Figure 14:
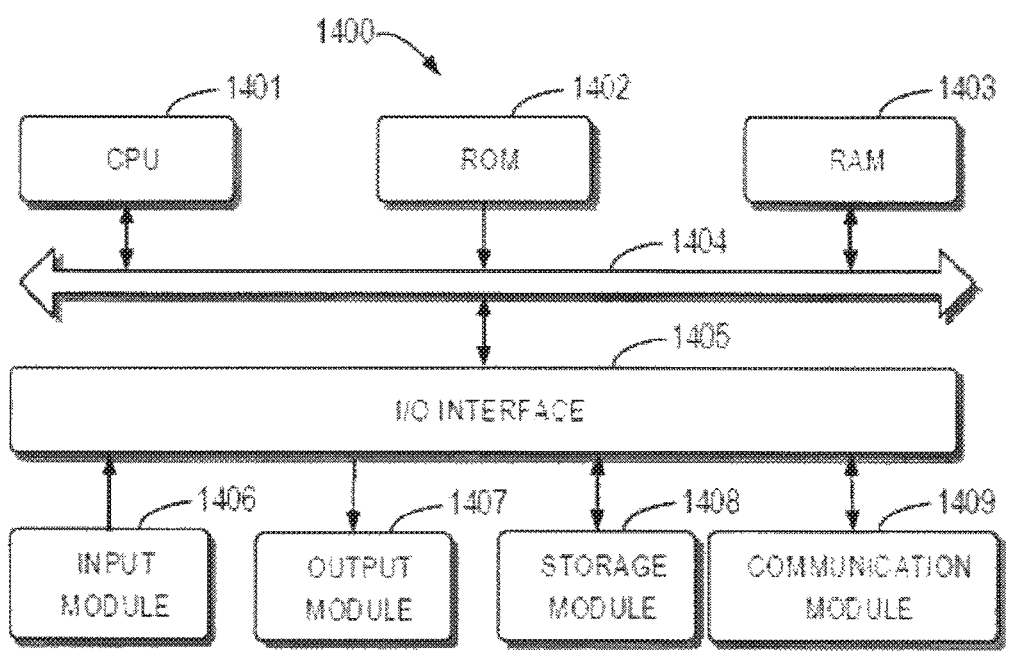
FIG. 14 shows a schematic structural diagram of an electronic device suitable for implementing embodiments of the present disclosure.

FIG. 14 shows a schematic structural diagram of an electronic device 1400 suitable for implementing embodiments of the present disclosure. As shown in FIG. 14, the electronic device 1400 comprises a central processing unit (CPU) 1401, which can execute various appropriate actions and processing based on computer program instructions stored in the read-only memory (ROM) 1402 or loaded from the storage module 1408 to the random access memory (RAM) 1403. Besides, all kinds of programs and data required by operating the electronic device 1400 can also be stored in RAM 1403. CPU 1401, ROM 1402 and RAM 1403 are connected to each other via bus 1404. Input/output (I/O) interface 1405 is also connected to the bus 1404.

A plurality of components in the electronic device 1400 is connected to the I/O interface 1405, including: an input module 1406, e.g., keyboard and mouse; output module 407, e.g., various types of displays and loudspeakers; storage module 1408, e.g., disk and optical disk; and communication module 1409, e.g., network card, modem and radio communication transceiver. The communication module 1409 allows the electronic device 1400 to exchange information/data with other devices via computer networks, such as Internet, and/or various telecommunication networks.

Each process and processing described above, e.g., methods 400-700, can be executed by the processing module 1401. For example, in some embodiments, the methods 400-700 can be implemented as computer software programs tangibly included in the machine-readable medium, such as storage module 1408. In some embodiments, the computer program can be partially or fully loaded and/or mounted to the electronic device 1400 via ROM 1402 and/or communication module 1409. When the computer program is loaded to RAM 1403 and executed by CPU 1401, one or more steps of the above described methods 400-700 can be implemented.

Generally speaking, various exemplary embodiments of the present disclosure can be implemented in hardware, or dedicated circuit, software, logic, or any combinations thereof. Some aspects can be implemented in the hardware and other aspects can be implemented in firmware or software executed by a controller, a microprocessor or other computing devices. When each aspect of the embodiments of the present disclosure is illustrated or described by a block diagram, a flow chart or represented by other graphics, it should be understood that the block diagram, the apparatus, the system, the technique or the method described here can act as non-restrictive examples implemented in hardware, software, firmware, application-specific circuit or logic, universal hardware or controller or other computing devices, or some combinations thereof.

As an example, embodiments of the present disclosure can be described in the context of the machine-executable instructions, which can be included in the program module executed in the device on the target tangible or virtual processor. Generally speaking, the program module comprises routines, programs, libraries, objects, classes, components and data structures etc. and executes specific tasks or realizes specific abstract data structure. In various embodiments, functions of the program module can be combined or divided between the described program modules. The machine-executable instructions for the program module can be executed locally or in distributed equipment. In the distributed equipment, the program module can be positioned between the local and remote storage media.

The computer program codes for implementing the method of the present disclosure can be programmed using one or more programming languages. These computer program codes can be provided to processors of universal computers, dedicated computers or other programmable data processing apparatuses, such that the program codes, when executed by computers or other programmable data processing apparatuses, cause the functions/operations stipulated in the flow chart and/or block diagram to be implemented. The program codes can be executed completely on the computer, partially on the computer, as an independent software package, partially on the computer and partially on the remote computer, or completely on the remote computer or on the server.

In the context of the present disclosure, the machine-readable medium can be any tangible media including or stored with programs for or related with instruction execution system, apparatus or device. The computer-readable medium can be machine-readable signal medium or machine-readable storage medium, wherein the computer-readable medium can comprise but not limited to electronic, magnetic, optical, electromagnetic, infrared or semiconductor system, apparatus or device, or any suitable combinations thereof. The detailed examples of the machine-readable medium comprise an electrical connection having one or more wires, a portable computer disk, a hard disk, a random access memory (RAM), a read-only memory (ROM), an electrically programmable read-only memory (EPROM or flash), an optical storage device, a disk storage device, or any combinations thereof.

Furthermore, although the operations are depicted in a specific order, it should not be understood that the operations are required to be completed according to the shown specific order or in succession, or all operations shown in the drawings should be executed to acquire desirable results. In some cases, multi-tasking or parallel processing may be beneficial. Similarly, although the above discussion comprises some specific implementation details, they should not be appreciated as limiting the scope of any inventions or claims. Instead, they should be understood as descriptions about a specific embodiment for a given invention.

Some features described in the context of different embodiments of the present description can also be integrated and implemented in one single embodiment. On the contrary, various features described in the context of the single embodiment can also be separately implemented in several embodiments or any suitable combinations of the embodiments.

Although the subject matter has been described with languages specific to structural features and/or method actions, it should be understood that the subject matter defined in the attached claims shall not limit to the specific features or actions described above. On the contrary, the specific features or actions described above are disclosed as an example form for implementing the claims.

We claim:

1. A method of storing data by a computerized system, comprising:
   obtaining a data block;
   splitting the data block into at least a first portion and a second portion; and
   storing the data block in a storage space having boundaries at predetermined intervals, including placing the first portion in a first interval of the predetermined intervals and placing the second portion in a second interval of the predetermined intervals, the first interval having a padding block stored between a boundary of the first interval and the first portion,
   wherein splitting the data block is performed in response to determining that an end offset of the data block is smaller than a boundary of the first interval and larger than the boundary of the first interval minus twice a sum of a size of a header and a size of a footer of the data block.

2. The method of claim 1, wherein a garbage collection tracking unit performs garbage collection on a per-interval basis of the pre-determined intervals.

3. The method of claim 2, wherein the garbage tracking unit performs the garbage collection on garbage data associated with one or more objects, or fragments thereof, in the data block that are deleted or overwritten.

4. The method of claim 3, wherein splitting the data block is performed in response to a comparison of a size of the data block with a size of the garbage collection tracking unit.

5. The method of claim 4, further comprising generating identical metadata for the first and second portions of the data block, the garbage tracking unit tracking the first and second portions of the data block based upon the identical metadata.

6. The method of claim 1, wherein when storing the data block, the method further comprises placing, on one side of the boundary, an entire length of one of the padding block, the first portion of the data block, and the second portion of the data block.

7. The method of claim 1, wherein when storing the data block, the method further comprises extending one of the padding block, the first portion of the data block, and the second portion of the data block up to, but not beyond, the boundary.

8. The method claim 1, wherein the data block is split into at least first through fourth portions, and wherein storing the data block includes placing the third portion of the data block in a third interval of the predetermined intervals and placing the fourth portion of the data block in a fourth interval of the predetermined intervals, the third interval having a first particular padding block stored between a boundary of the third interval and the third portion.

9. The method claim 8, wherein the data block is additionally split into at least fifth and sixth portions, and wherein storing the data block further includes placing the fifth portion of the data block in a fifth interval of the predetermined intervals and placing the sixth portion of the data block in a sixth interval of the predetermined intervals, the fifth interval having a second particular padding block stored between a boundary of the boundaries of the fifth interval and the fifth portion.

10. The method of claim 1, wherein the padding block stored between the boundary of the first interval and the first portion includes a checksum of the padding block.

11. The method of claim 10, wherein the padding block includes a header and a body, and wherein the checksum provides validation of both the header and the body of the padding block.

12. The method of claim 11, wherein the padding block further includes a footer that stores the checksum, wherein the header of the padding block indicates a size of the padding block, and wherein the body of the padding block is zero.

13. A computerized system, comprising control circuitry that includes a set of processing units coupled to memory, the control circuitry constructed and arranged to:
obtain a data block;
split the data block into at least a first portion and a second portion; and
store the data block in a storage space having boundaries at predetermined intervals, including placing the first portion in a first interval of the predetermined intervals and placing the second portion in a second interval of the predetermined intervals, the first interval having a padding block stored between a boundary of the first interval and the first portion,
wherein the control circuitry is constructed and arranged to split the data block in response to a determination that an end offset of the data block is smaller than a boundary of the first interval and larger than the boundary of the first interval minus twice a sum of a size of a header and a size of a footer of the data block.

14. The computerized system of claim 13, wherein the control circuitry is further constructed and further arranged to include a garbage collection tracking unit that performs garbage collection on a per-interval basis of the predetermined intervals.

15. The computerized system of claim 14, wherein the garbage collection tracking unit performs the garbage collection on garbage data associated with one or more objects, or fragments thereof, in the data block that are deleted or overwritten.

16. The computerized system of claim 15, wherein the control circuitry is further constructed and further arranged to split the data block in response to a comparison of a size of the data block with a size of the garbage collection tracking unit.

17. The computerized system of claim 16, wherein the control circuitry is further constructed and further arranged to generate identical metadata for the first and second portions of the data block, and the garbage tracking unit tracks the first and second portions of the data block based upon the identical metadata.

18. The computerized system of claim 13, wherein the control circuitry is further constructed and further arranged, when storing the data block, to place, on one side of the boundary, an entire length of one of the padding block, the first portion of the data block, and the second portion of the data block.

19. The computerized system of claim 13, wherein the control circuitry is further constructed and further arranged, when storing the data block, to extend one of the padding block, the first portion of the data block, and the second portion of the data block up to, but not beyond, the boundary.

20. The computerized system of claim 13, wherein the data block is split into at least first through fourth portions, and wherein the control circuitry is further constructed and further arranged, when storing the data block, to place the third portion of the data block in a third interval of the predetermined intervals and place the fourth portion of the data block in a fourth interval of the predetermined intervals, the third interval having a first particular padding block stored between a boundary of the third interval and the third portion.

21. The computerized system of claim 20, wherein the data block is additionally split into at least fifth and sixth portions, and wherein the control circuitry is further constructed and further arranged, when storing the data block, to place the fifth portion of the data block in a fifth interval of the predetermined intervals and place the sixth portion of the data block in a sixth interval of the predetermined intervals, the fifth interval having a second particular padding block stored between a boundary of the boundaries of the fifth interval and the fifth portion.

22. A computer program product including a set of non-transitory, computer-readable media having instructions which, when executed by control circuitry of a computerized system, cause the control circuitry to perform a method of storing data, the method comprising:
obtaining a data block;
splitting the data block into at least a first portion and a second portion; and
storing the data block in a storage space having boundaries at predetermined intervals, including placing the first portion in a first interval of the predetermined intervals and placing the second portion in a second interval of the predetermined intervals, the first interval having a padding block stored between a boundary of the first interval and the first portion,
wherein splitting the data block is performed in response to determining that an end offset of the data block is smaller than a boundary of the first interval and larger than the boundary of the first interval minus twice a sum of a size of a header and a size of a footer of the data block.

* * * * *